(12) United States Patent
Van Uijen et al.

(10) Patent No.: US 8,800,247 B2
(45) Date of Patent: *Aug. 12, 2014

(54) APPARATUS FOR INFLATING AND SEALING PACKING CUSHIONS EMPLOYING FILM RECOGNITION CONTROLLER

(71) Applicant: Free-Flow Packaging International, Inc., Fremont, CA (US)

(72) Inventors: Rob Van Uijen, Kapelaan (NL); Michael G. Kaminski, San Jose, CA (US); Charles Daigle, San Jose, CA (US); Vladimir Yampolsky, Belmont, CA (US)

(73) Assignee: Free-Flow Packaging International, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,087

(22) Filed: Oct. 11, 2013

(65) Prior Publication Data

US 2014/0033645 A1    Feb. 6, 2014

Related U.S. Application Data

(62) Division of application No. 11/739,959, filed on Apr. 25, 2007, now Pat. No. 8,695,311.

(60) Provisional application No. 60/745,640, filed on Apr. 26, 2006.

(51) Int. Cl.
*B31D 5/00*    (2006.01)
*B65B 31/06*    (2006.01)

(52) U.S. Cl.
CPC .............. *B31D 5/0073* (2013.01); *B65B 31/06* (2013.01)
USPC .................................................. 53/64; 53/79

(58) Field of Classification Search
CPC ...................................................... B31D 5/0073
USPC ...................... 53/55, 57, 58, 64, 168, 403, 79; 340/572.4, 572.8, 679, 680
See application file for complete search history.

(56) References Cited

U.S. PATENT DOCUMENTS

| | | |
|---|---|---|
| 2,675,054 A | 4/1954 | Langer |
| 3,868,285 A | 2/1975 | Troy |
| 4,169,002 A | 9/1979 | Larson |

(Continued)

FOREIGN PATENT DOCUMENTS

| | | |
|---|---|---|
| JP | 200155202 | 2/2001 |
| WO | WO0043198 | 7/2000 |
| WO | WO0043270 | 7/2000 |

OTHER PUBLICATIONS

European Search Report completed Sep. 27, 2011 for EP 11 00 3986, 6 pages.

(Continued)

*Primary Examiner* — Stephen F Gerrity
(74) *Attorney, Agent, or Firm* — Banner & Witcoff, Ltd.

(57) ABSTRACT

An apparatus for inflating and sealing packing cushions utilizes a controller adapted for acquiring information from preconfigured film material and automatically setting one or more operation parameters suitable for inflating and sealing the film. The controller can avoid or limit the need for user input, thus simplifying use of the apparatus.

12 Claims, 15 Drawing Sheets

(56) References Cited

U.S. PATENT DOCUMENTS

| | | | |
|---|---|---|---|
| 4,564,913 | A | 1/1986 | Yomogida et al. |
| 4,807,140 | A | 2/1989 | Saulnier |
| 4,821,198 | A | 4/1989 | Takeuchi et al. |
| 5,347,463 | A | 9/1994 | Nakamura et al. |
| 5,873,215 | A | 2/1999 | Aquarius et al. |
| 6,099,178 | A | 8/2000 | Spurr et al. |
| 6,123,024 | A * | 9/2000 | Williams et al. ............. 101/129 |
| 6,209,286 | B1 | 4/2001 | Perkins et al. |
| 6,249,227 | B1 | 6/2001 | Brady et al. |
| 6,375,785 | B1 | 4/2002 | Aquarius |
| 6,381,416 | B2 | 4/2002 | Manico et al. |
| 6,386,772 | B1 | 5/2002 | Klinefelter et al. |
| 6,410,119 | B1 | 6/2002 | De Luca et al. |
| 6,460,313 | B1 | 10/2002 | Cooper |
| 6,486,780 | B1 | 11/2002 | Garber et al. |
| 6,582,800 | B2 | 6/2003 | Fuss et al. |
| 6,588,666 | B1 | 7/2003 | Sacchetti et al. |
| 6,644,771 | B1 * | 11/2003 | Silverbrook .................... 347/19 |
| 6,659,150 | B1 | 12/2003 | Perkins et al. |
| 6,669,150 | B2 | 12/2003 | Benoit et al. |
| 6,677,852 | B1 | 1/2004 | Landt |
| 6,761,960 | B2 | 7/2004 | De Luca et al. |
| 6,802,659 | B2 | 10/2004 | Cremon et al. |
| 6,816,749 | B2 | 11/2004 | Nakata et al. |
| 6,817,789 | B2 | 11/2004 | Maruhashi et al. |
| 6,877,297 | B2 | 4/2005 | Armington et al. |
| 6,932,134 | B2 | 8/2005 | Selle et al. |
| 6,952,624 | B2 | 10/2005 | Mori |
| 6,963,351 | B2 | 11/2005 | Squires et al. |
| 6,976,900 | B2 | 12/2005 | Bolz |
| 6,982,113 | B2 | 1/2006 | Kannankeril et al. |
| 7,090,912 | B2 | 8/2006 | Perkins et al. |
| 7,121,457 | B2 | 10/2006 | Michal, III |
| 7,165,375 | B2 * | 1/2007 | O'Dowd .......................... 53/96 |
| 7,174,696 | B2 | 2/2007 | Perkins et al. |
| 2002/0191998 | A1 * | 12/2002 | Cremon et al. ................ 400/76 |
| 2003/0025027 | A1 | 2/2003 | Ebisawa et al. |
| 2003/0072922 | A1 | 4/2003 | Haines |
| 2003/0163976 | A1 | 9/2003 | Perkins et al. |
| 2003/0212467 | A1 | 11/2003 | Ogihara et al. |
| 2003/0229543 | A1 | 12/2003 | Zimmerman et al. |
| 2004/0102870 | A1 | 5/2004 | Andersen et al. |
| 2004/0134164 | A1 | 7/2004 | Perkins et al. |
| 2005/0044813 | A1 | 3/2005 | Noorian |
| 2005/0198920 | A1 | 9/2005 | Nakagawa et al. |
| 2005/0231583 | A1 | 10/2005 | Maghakian |
| 2006/0112663 | A1 * | 6/2006 | Perkins et al. .................. 53/403 |
| 2006/0213147 | A1 * | 9/2006 | Loibl ................................ 53/79 |
| 2007/0251190 | A1 * | 11/2007 | Daigle et al. .................... 53/403 |

OTHER PUBLICATIONS

EPO Communication dated Jun. 14, 2010 (Supplementary European Search Report) for corresponding EP Application 07809023.0-2308/2010433 PCT/US2007009982, 8 pages.

* cited by examiner

APPARATUS FOR INFLATING AND SEALING PACKING CUSHIONS EMPLOYING FILM RECOGNITION CONTROLLER

CROSS REFERENCE TO RELATED APPLICATIONS

This application is a division of application Ser. No. 11/739,959, filed Apr. 25, 2007, now U.S. Pat. No. 8,695,311, which claims benefit under 35 U.S.C. §119(e) to Application No. 60/745,640, filed Apr. 26, 2006, the disclosures of which are hereby incorporated by reference.

DESCRIPTION OF RELATED ART

Air-filled pillows or cushions may be used as a packing material and void filler in shipping cartons and the like. Such cushions typically have two layers of plastic film material which may be sealed together to form chambers that are filled with air or other suitable gas. The cushions are usually made from a long roll of material which typically has a longitudinal direction along the film and a traverse direction across the film. The film may be made of plastic or other suitable material known in the art. The film may be supplied and stored in rolls or in boxes. Typically, the film includes perforations which may be disposed generally in the transverse direction across the film, but may also be located in other orientations such as diagonally. The perforations may be variously configured such as between one or more successive ones of the cushions so they can be torn apart or otherwise separated.

Although very light in weight, air-filled cushions take up a substantial amount of space. To reduce the volume of material which must be shipped and stored, such cushions are commonly made at or near the point of use. To avoid the need for packers and shippers to have large, complex cushion making machines in their facilities, suppliers of air-filled packing cushions often provide their customers with prefabricated film materials in which the major seals and perforations have already been formed.

Packers and shippers who use the prefabricated film materials are provided with relatively inexpensive and easy-to-use machines for inflating and sealing the materials to complete the cushions at or near the point of use. Many machines are equipped with an elongate guide member which is inserted into a longitudinally extending channel in the film for guiding the film through the machine. In some machines, the guide includes a nozzle for injecting air into the cushion chambers. In other machines, air is injected from an injector separate from the guide. Examples of machines in which air is injected into cushion chambers through an elongate guide member include U.S. Pat. Nos. 6,209,286, 6,659,150, 6,410,119, and 7,174,696, all to the present assignee, the disclosures of which are incorporated herein by reference. Examples of machines in which inflation gas is injected into an open edge of a film or through perforations are shown in WO 00/43198, WO 00/43270, and U.S. Pat. Nos. 5,873,215 and 6,375,785, each owned by the present assignee, the disclosures of which are incorporated herein by reference.

Although relatively easy to use, currently available inflation and sealing machines generally require some level of user input, particularly when a roll of film is replaced with a roll of film of different thickness, material composition, and/or other properties which can affect parameters such as sealing temperature and pressure. It would be desirable to develop a machine which may be easier to use by eliminating or minimizing the need for user input. This potentially could result in cost savings by reducing the length of time needed for operator training as well as reducing the occurrences of wasted materials due to operator error.

In conventional inflation and sealing machines, sealing pressure typically is preset for films of a particular thickness or thickness range. When a user wishes to switch between films of different thicknesses, it often is necessary to adjust sealing pressure in order to achieve acceptable performance. Such adjustments generally require a technician to service the machine, typically to disassemble the sealing mechanism and replace springs and/or other machine components. It would be desirable to develop a machine which facilitates relatively easy control of sealing pressure so that adjustments can be made without requiring significant disassembly of the machine or replacement of parts.

SUMMARY OF THE INVENTION

Aspects of the present invention include a method and apparatus for making air-filled packing cushions from prefabricated film material. In some embodiments, the prefabricated film material may include a longitudinally extending channel and inflatable chambers which communicate with the channel. In these embodiments, the film material may be fed onto an elongate member which may be positionable in the longitudinally extending channel and configured to have inflation gas introduced into the chambers using a separate or integral injector to inflate the cushions. In alternative embodiments, a film material may have an open edge into which an inflation gas is injected from an injector.

One aspect of the invention involves facilitating controllability of sealing pressure. Sealing pressure can be adjusted, for example, by altering the distance between a sealing element and a backing surface or by compressing springs or a resilient material to create more or less seal force. In a preferred embodiment, a linear actuator is provided for adjusting the relative position of the sealing element and/or backing surface. In another embodiment, sealing pressure can be adjusted by simple manual action, e.g., by rotating a thumb screw or the like to adjust the relative position of the sealing element and/or backing surface, without requiring significant disassembly of the machine or replacement of parts.

In one embodiment, one or more operation parameters appropriate for a given film, such as sealing pressure, sealing temperature, air-fill level, and dwell time, are inputted into the machine (e.g., manually or automatically) and compared to the corresponding existing machine setting(s). If the existing setting(s) are appropriate, machine operation is permitted to begin or resume. If one or more settings are not appropriate, the setting(s) are adjusted and then operation of the machine begins or resumes.

According to one aspect of the invention, an apparatus for inflating and sealing packing cushions is provided with a controller capable of determining at least one property of film that is positioned in proximity to the apparatus. In some aspects, the controller obtains information from the supply of film when the supply is placed in the operating position. Alternatively, the apparatus may be configured so that the controller acquires information when the film is positioned within a predetermined distance from the apparatus, whether or not in the operating position. In another alternative, the apparatus may be equipped with a device, such as a bar code reader, which an operator actuates to cause the controller to acquire information from the film supply.

In another aspect of the invention, a source of preconfigured film material having inflatable chambers is provided with a data source containing information relating to one or more properties of the film and/or conditions appropriate for its inflation and sealing. The data source may be a radio frequency identification (RFID) tag, a bar code, registration marks, or other machine-readable source of information. In one preferred embodiment, a tag is also machine-writable so that information can be written back to the tag. For example, during operation the amount of film material processed from the supply can be written to the tag. This way, when the supply of film material is exhausted, the tag will contain information reflecting that no material remains on the supply. This information can be communicated to a machine to prevent operation of the machine in the event a tag has been removed from an expired film supply and affixed to a new film supply. Because the tag contains information unique to processing of a film material having particular characteristics, it is desirable to prevent reuse of the tag with different film materials, which generally require different sets of processing conditions. Processing film material under improper conditions is undesirable because it can result in poor performance, such as melting or burning of the film, inadequate seal strength, and/or improper inflation levels.

In yet another aspect of the invention, a core onto which a preconfigured film material having inflatable chambers can be wound is provided with a data source containing information relating to one or more properties of the film and/or conditions appropriate for its inflation and sealing. The data source may be a radio frequency identification (RFID) tag, a bar code, registration marks, or other machine-readable source of information. Preferably, a tag is provided which is also machine-writable. For example, information relating to the presence, absence, or amount of film material on the core can be written onto the tag and used to control operation or effect operation of a machine for inflating and sealing packing cushions. It may be desirable to prevent re-use of a tag from an exhausted film supply by preventing operation of the machine when the tag indicates that all of the original film has been exhausted. Reusing tags with different film materials can lead to inappropriate operation parameters and thus poor performance, such as melting or burning of the film, inadequate seal strength, and/or improper inflation levels.

While certain aspects of the invention have been called out specifically in the Summary of the Invention for illustrative purposes, additional aspects of the invention are defined below in the remaining portions of the specification. The aforementioned aspects of the invention and the additional aspects of the invention detailed below may be utilized in any suitable combination and subcombination.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

According to one aspect of the invention, an apparatus for inflating and sealing packing cushions is adapted to facilitate controllability of sealing pressure. Sealing pressure adjustments may be needed to adapt a machine to process films of different thickness, for example. In a preferred embodiment, a linear actuator is provided for adjusting the relative position of a sealing element and/or a backing surface to control sealing pressure. In another embodiment, sealing pressure can be adjusted by simple manual action, e.g., by rotating a thumb screw or the like to adjust the relative position of the sealing element and/or backing surface, without requiring significant disassembly of the machine or replacement of parts.

In one embodiment, one or more operation parameters are identified for a film material to be processed in an apparatus for inflating and sealing packing cushions. As shown schematically in FIG. 15, the operation parameters may include, for example, sealing pressure 150$a$, sealing temperature 150$b$, air-fill level 150$c$, and/or dwell time 150$d$. The parameter(s) are inputted into the machine and compared to the corresponding existing machine setting(s), illustrated in FIG. 15 as 151$a$. A user may enter the setting(s) manually, for example on a keypad or, as discussed more fully below, the parameter(s) can be communicated from the film supply to the machine via radio frequency identification (RFID), a bar code reader, or the like. If the existing machine setting(s) are appropriate, machine operation is permitted to begin or resume. If one or more settings are not appropriate, the setting(s) are adjusted and then operation of the machine begins or resumes.

Figure 15:
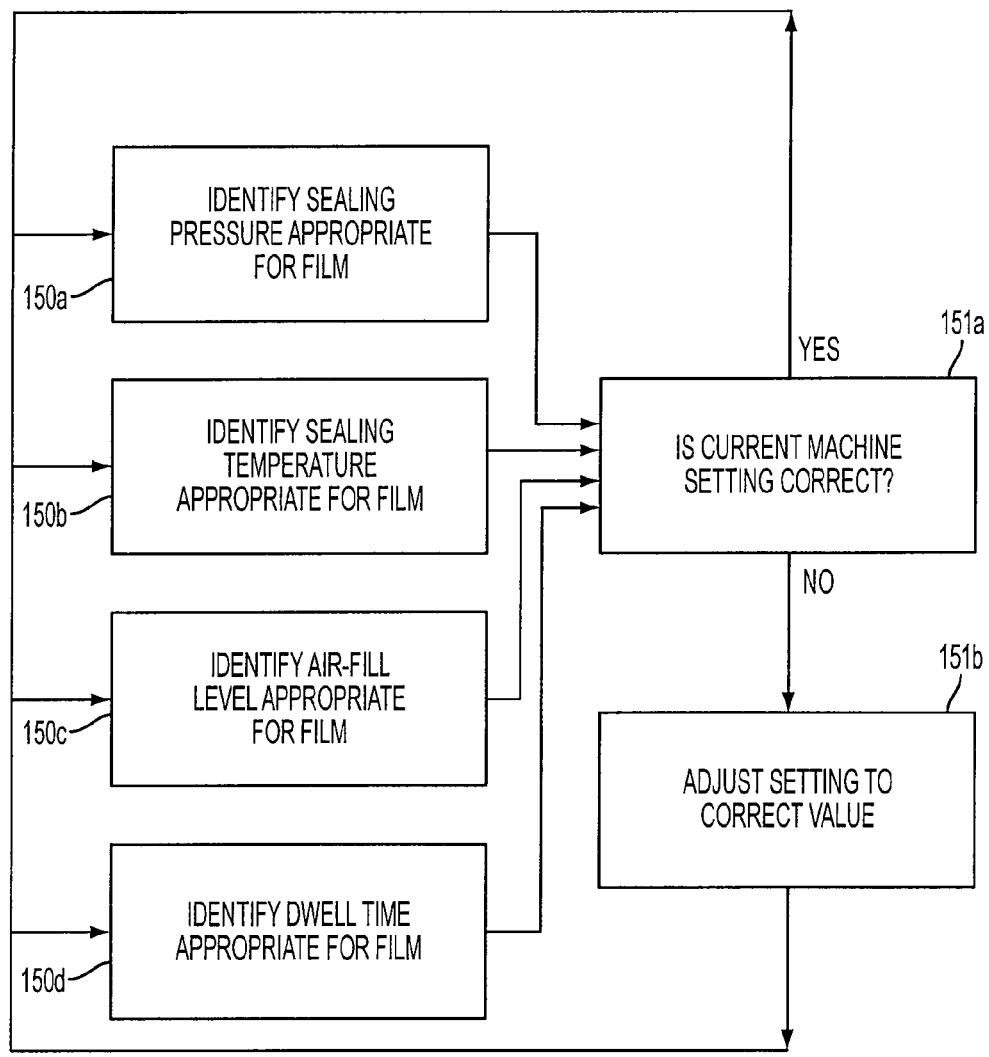
FIG. 15 is a flowchart illustrating the identification and adjustment of one or more operation parameters in accordance with one aspect of the present invention.

The flowchart shown in FIG. 15 illustrates a continuous loop in which parameters appropriate for the film are identified (150*a*, 150*b*, 150*c*, and/or 150*d*) following a confirmation of correct settings (represented by arrow extending above 151*a*) or an adjustment of the settings to an appropriate value (represented by arrow extending below 151*b*). This continuous aspect may represent, for example, an operator checking parameters when a fresh roll of film is installed onto the machine or when a roll of film is installed that is different in some respect from the roll of film most recently processed by the machine. In embodiments where parameters are communicated to the machine from the film supply by radio frequency identification (RFID) or the like, the parameters may be identified upon installation of a fresh roll of film or in some cases more frequently, for example when RFID tags, registration marks, or the like are provided at periodic intervals along the supply of film. In either case (whether parameters are inputted by the operator or communicated from the film supply), further adjustments may be made by an operator during machine operation, e.g., based on inspecting the inflated cushions. A higher sealing temperature may be selected, for example, to increase seal strength or air-fill level may be adjusted if the cushions are inflated more or less than desired.

In one embodiment of the invention, the device can be equipped with a control system for obtaining information from the film or film supply. The information can be contained on the film itself or on structure associated with a film supply, for example on a core on which a roll of film is wound. The information obtained from the film or film supply can be used to set one or more operating parameters for operation of the apparatus, such as seal temperature, seal pressure, air-fill levels, and operational timing delays in the drive components. These and other operating parameters may be affected by the thickness and composition of the film, the size and configuration of the inflatable chambers, and/or other properties of the film. The controller can be retrofitted to an existing device or incorporated into a new device.

Figure 1:
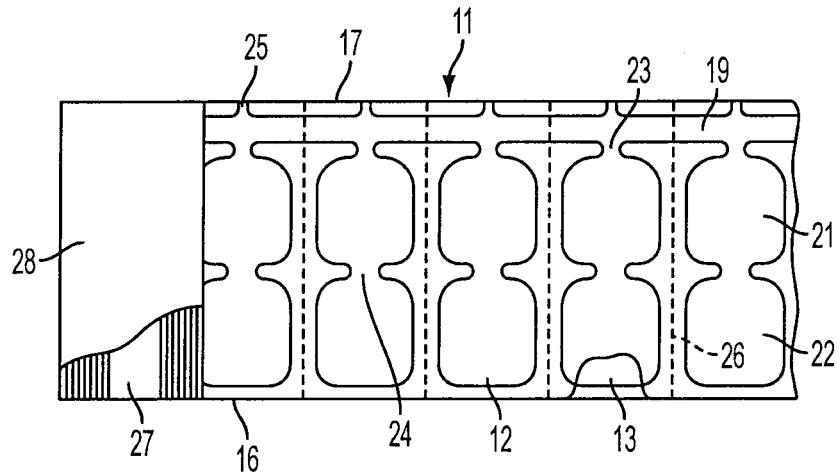
FIG. 1 is a plan view, partly broken away, of a prefabricated film material usable for making air-filled packing cushions.

The inflation and sealing apparatus may have any of a number of different configurations, several examples of which are described below. The prefabricated film material can have various configurations, such as having seal lines defining generally rectangular chambers as shown in U.S. Pat. No. 7,090,912 to Perkins et al. or U.S. Pat. No. 6,582,800 to Fuss et al., or undulating seal lines defining non-rectangular chambers, e.g., as shown in U.S. Pat. Nos. 6,410,119 and 6,761,960 to De Luca et al. By way of example, FIG. 1 shows a film having two layers 12, 13 of a suitable film material such as a polymer material including such materials as high density polyethylene or low density polyethylene. For example, the films may include any suitable polyolefin including, for example, a low density polyethylene, a homogeneous ethylene/alpha-olefin copolymer such as a metallocene-catalyzed ethylene/alpha-olefin copolymer, a medium density polyethylene, a high density polyethylene, a polyethylene terephthalate, a polypropylene, a nylon, a polyvinylidene chloride including one or more of a methyl acrylate or vinyl chloride copolymers of vinylidene chloride, polyvinyl alcohol, polyamide, or any suitable combination of the foregoing. Depending on the various applications, these films may have any suitable thickness such as from about 0.05 to about 25 mils. In most environments, the films will be between about 0.5 and 4 mils thick.

The material can be in the form of flattened tubing which is joined together, or closed, along both of its longitudinal edges 16, 17, or it can be open along one or both edges.

In the film material shown in FIG. 1, a single elongated sheet, or strip, of film material is formed, for example, by slitting an extruded bubble or by folding a web of material along its centerline to form edge 16. Other methods may be used for preparing the film material, such as by heat sealing overlying webs. The opposite edge 17 may be closed or open. In one embodiment, edge 16 is closed and edge 17 is open.

Again referring to FIG. 1, the two layers of film may be sealed together to form a longitudinally extending channel 19 and any number of suitably configured inflatable chambers 21, 22. The channel 19 may be variously configured along one or both edges and/or along the middle of the film. Where the channel extends longitudinally near one edge of the material, one or more chambers 21, 22 may be arranged in a generally transverse direction across the material either in a perpendicular direction to the channel or in an angular direction to the channel. Inlet openings 23 may be configured to extend between the channel 19 and one of the chambers. In these embodiments, it may be desirable for the openings 24 to interconnect the chambers. Optionally, a plurality of outlet ports 25 may be included to permit excess air to escape from the channel 19 during inflation and sealing. Where outlet ports are included, they may extend between channel 19 and the edge 17 of the material. The edge 17 may be unsealed in the region of the outlet port 25 to permit excess air to escape through the open edge 17. Alternatively, the edge 17 can be sealed, in which case excess air may be permitted to escape through perforations 26 extending laterally across the channel 19 and/or through the outlet ports 25. Other variations are possible. For example, some outlet ports 25 may be open at the edge 17 and other outlet ports 25 closed at the edge 17.

Optionally, generally transverse or diagonal rows of perforations 26 may extend about across the film between the chambers of successive cushions or groups of cushions to facilitate separation of the material either before or after the chambers are inflated. Alternatively, the perforations 26 can extend through the inflatable chambers 21, 22 and/or the outlet openings 25 to separate groups of cushions.

Figure 7:
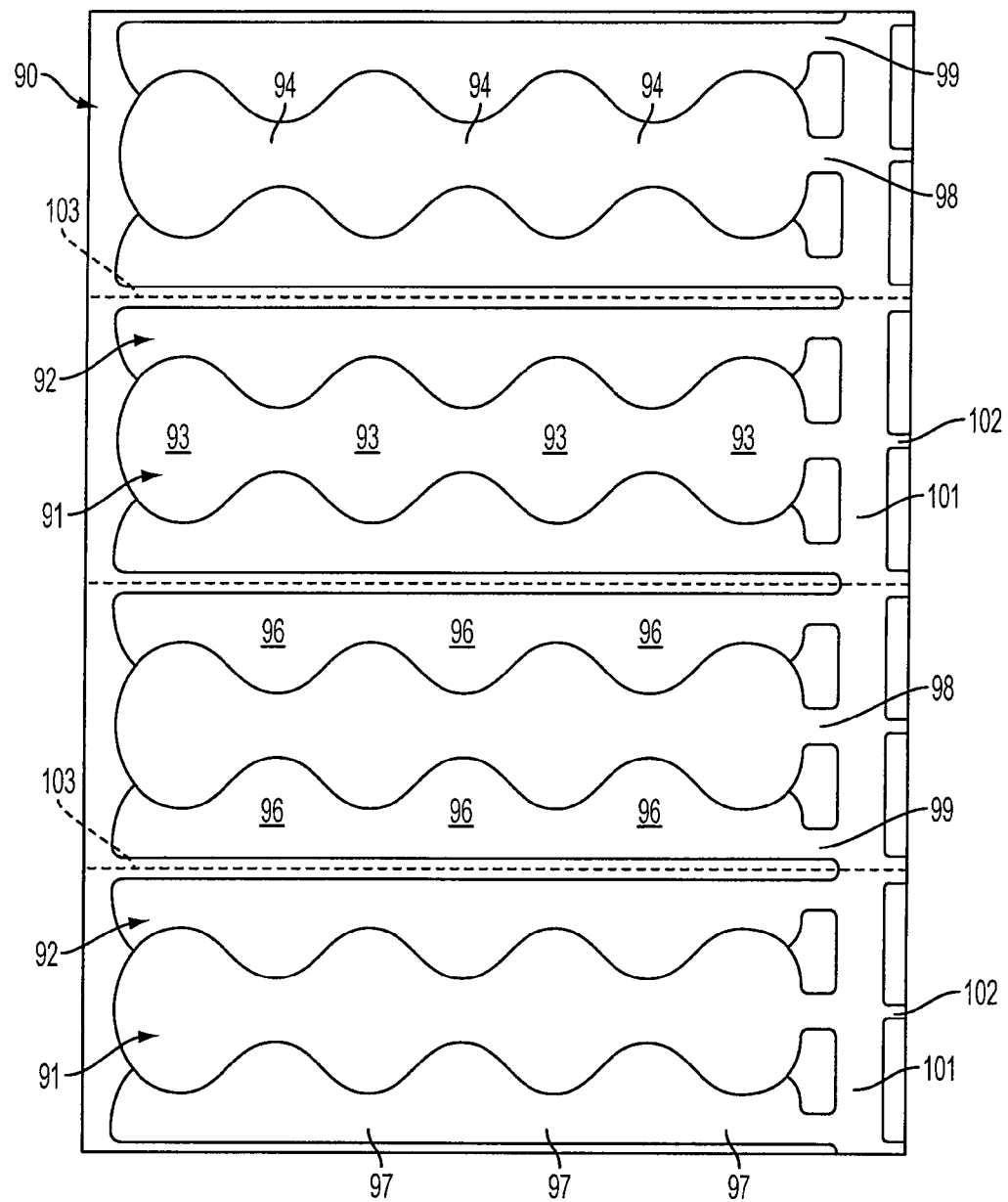
FIG. 7 is a plan view of another a prefabricated film material usable in making air-filled packing cushions.

In the film material illustrated in FIG. 7, each cushion 90 may have one or more full-size chambers 91 and optionally two or more half-size chambers 92. The full-size chamber may be alternatively configured to have any number of discrete sections 93 (e.g., four) which may be positioned side-by-side across the film material, with openings 94 between them. Each half-size chamber may also have any number of sections 96 (e.g., three), with openings 97 between them.

Inlet openings 98, 99 may extend laterally between a longitudinally extending channel 101 and the first section in each of the chambers. Further, one or more outlet openings 102 may extend between the longitudinally extending channel and the exterior of the cushion. In one embodiment, the outlet openings extend to an adjacent edge of the film material. Perforations 103 may be provided between the cushions for use in separating them.

Figure 13:
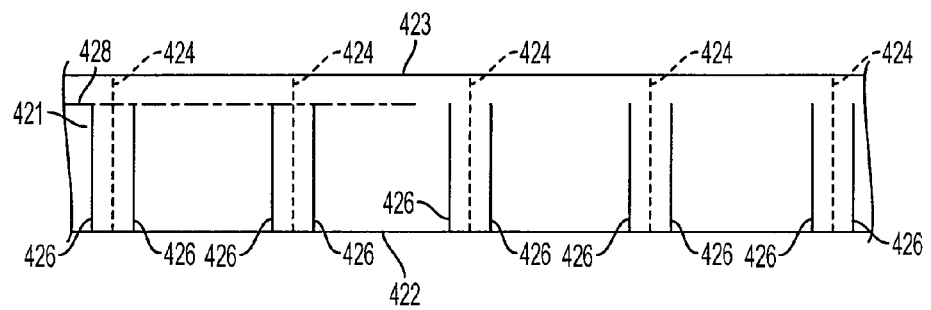
FIG. 13 shows a preconfigured film material having an open edge through which the chambers can be inflated.

FIG. 13 shows an example of a preconfigured film 421 as described in WO 00/43198. The film 421 can be folded along its centerline to form a closed edge 422 and an open edge 423. Transverse rows of perforations 424 are formed at regular intervals along the length and extend across the entire width of the material. The material is sealed together along seal lines 426 formed on opposite sides of the perforations 424. The seal lines extend from the closed edge 422 to within a short distance from the open edge 423. During inflation, air or other inflation gas is injected between the two layers, and a machine seals the layers together along a longitudinally extending seal line 428 to contain the air or other gas in the cushions.

Figure 14:
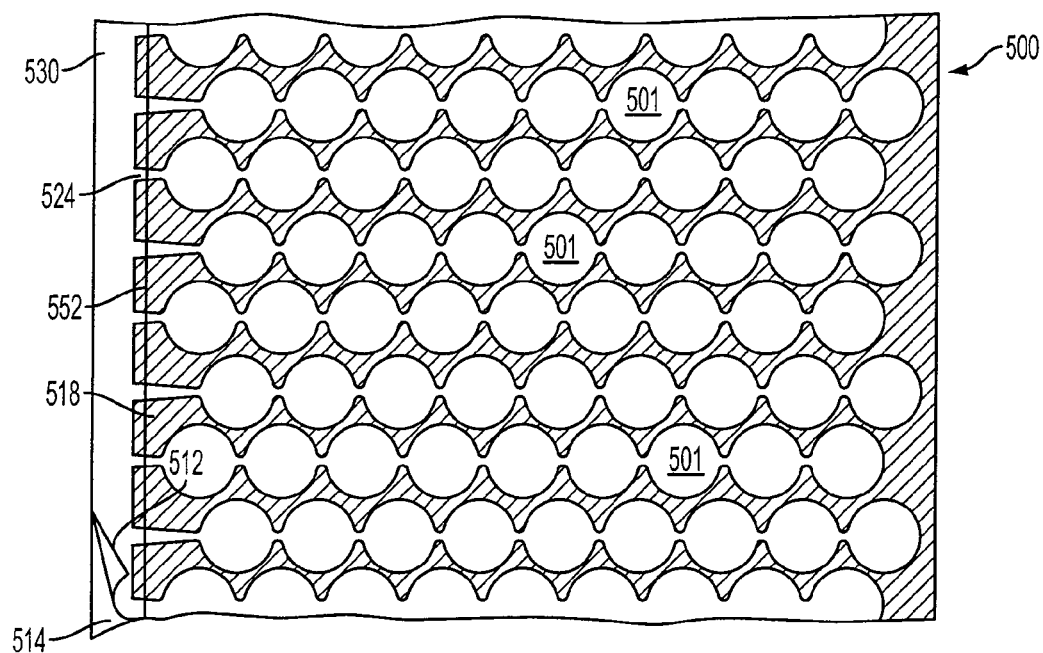
FIG. 14 is an alternative preconfigured film material having an open edge through which the chambers can be inflated.

FIG. 14 shows another example of a preconfigured film 500 that can be inflated through an open edge, as described in U.S. Pat. No. 6,982,113 B2. The film has two layers 512 and 514 sealed to each other in a pattern of seals 518, leaving unsealed areas which define the inflatable chambers 501 and inflation ports 524. The layers may be adhered by heat sealing or by use of an interposed adhesive. A pair of longitudinal flanges 530 are formed by the portion of the films 512 and 514 that extend beyond the inflation ports 524 and intermittent seals 518. The chambers 501 are inflated by injecting air through the flanges 530, and then a longitudinal seal 552 is formed to close off the inflated chambers 501.

The preconfigured film, such as any of the types shown in FIG. 1, 7, 13, or 14, may be wound into rolls or folded into boxes to form a supply that can be used with the inflation and sealing apparatus.

Figure 2:
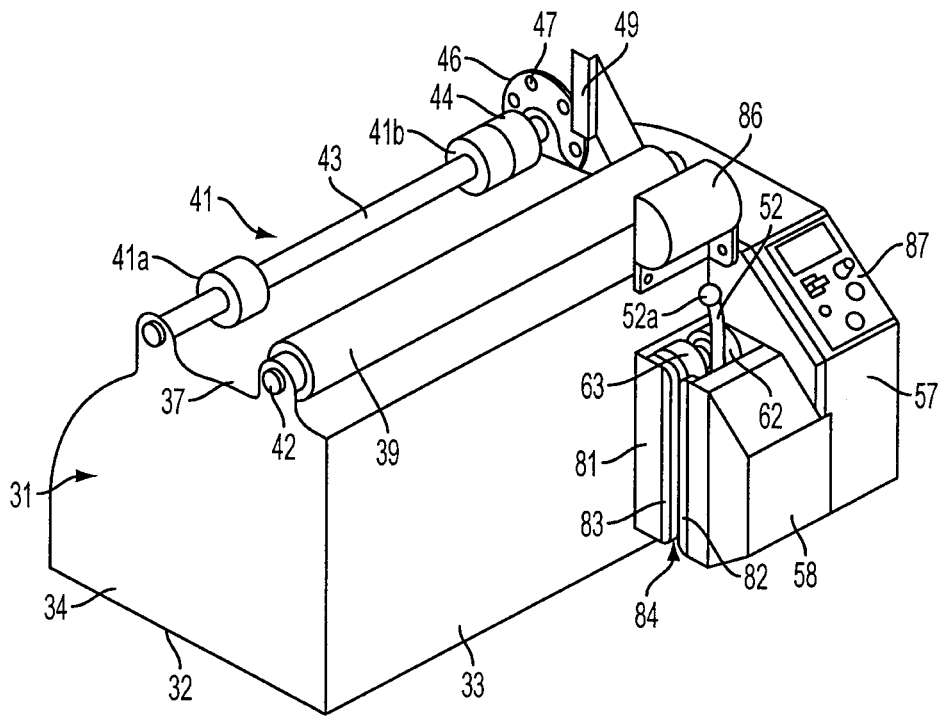
FIG. 2 is a perspective view of an apparatus for inflating and sealing air-filled packing cushions as described in U.S. Pat. No. 7,174,696.

The various components of the apparatus, such as film supply, feed mechanisms, etc., may vary widely in configuration without departing from the spirit or scope of the present invention. For example, the path of the film can be generally horizontal, for example as shown in Perkins U.S. Pat. No. 6,209,286, or generally vertical, for example as shown in Perkins U.S. Pat. No. 6,659,150. An example of a configuration is illustrated in FIG. 2, which shows a compact, self-contained apparatus for inflating and sealing a prefabricated film material as described in U.S. Pat. No. 7,174,696. The apparatus may include a relatively small cabinet 31 which can be adapted to rest on a table top or other supporting surface. The cabinet has an L-shaped base 32 with an upstanding front wall 33, end walls 34, 36 and a removable cover 37 for the top and rear sides of the cabinet.

In the apparatus shown in FIG. 2, a pair of spaced apart, horizontally extending rollers 39, 41 may be disposed on the machine such as mounted on the upper side of the cabinet for receiving the roll of prefabricated film material. The roll may be disposed to rest on the rollers and be free to rotate as the material is drawn from it. In some embodiments where two spaced rollers are utilized, the gap between the rollers is less than the diameter of the core so that the roll will not drop between the rollers as it decreases in size. If desired, the axis of one or both of the rollers can be inclined slightly, e.g., up to about 10 degrees, in order to keep the roll against a stop toward one side of the machine. In other alternative embodiments, the film may be positioned differently, such as drawn from a box or supported by a cantilevered roller.

Again referring to FIG. 2, roller 39 may be rotatively mounted on a stationary shaft 42 which extends between end walls 34, 36 near the front the cabinet. Roller 41 may include two relatively short rollers 41a, 41b mounted on a rotatively mounted shaft 43 to the rear of roller 39. The rollers 41a, 41b may be positioned toward opposite sides of the machine for engagement with the roll of film material toward the edges of the roll. A roller 44 may be mounted on shaft 43 next to roller 41b and directly beneath longitudinally extending channel 19 in the prefabricated film. A disk 46 is also mounted on shaft 43, with openings 47 which may be detected optically to monitor rotation of the roll and the removal of material from it.

In the apparatus shown in FIG. 2, a stop 49 may be located toward one side of the cabinet and may be configured to as a guide for positioning the roll on the rollers. Where a stop is used, the roll may be placed on the rollers with the edge adjacent to the longitudinally extending channel 19 abutting against the stop 49 so that the channel 19 and the inlet openings 23 may be in the same position regardless of the width of the roll. As noted above, one or both of the rollers can be inclined down toward the side of the cabinet where the stop is located to help keep the roll against the stop. With one or both of the rollers inclined in this manner, they are still substantially horizontal, and the axis of the roll is still substantially parallel to the axes of the rollers. The roll can be of any desired width, and it can even overhang the side of the cabinet opposite the stop as long as it is not so wide that the weight of the overhang causes the roll to tip or be unstable on the rollers.

Figure 3:
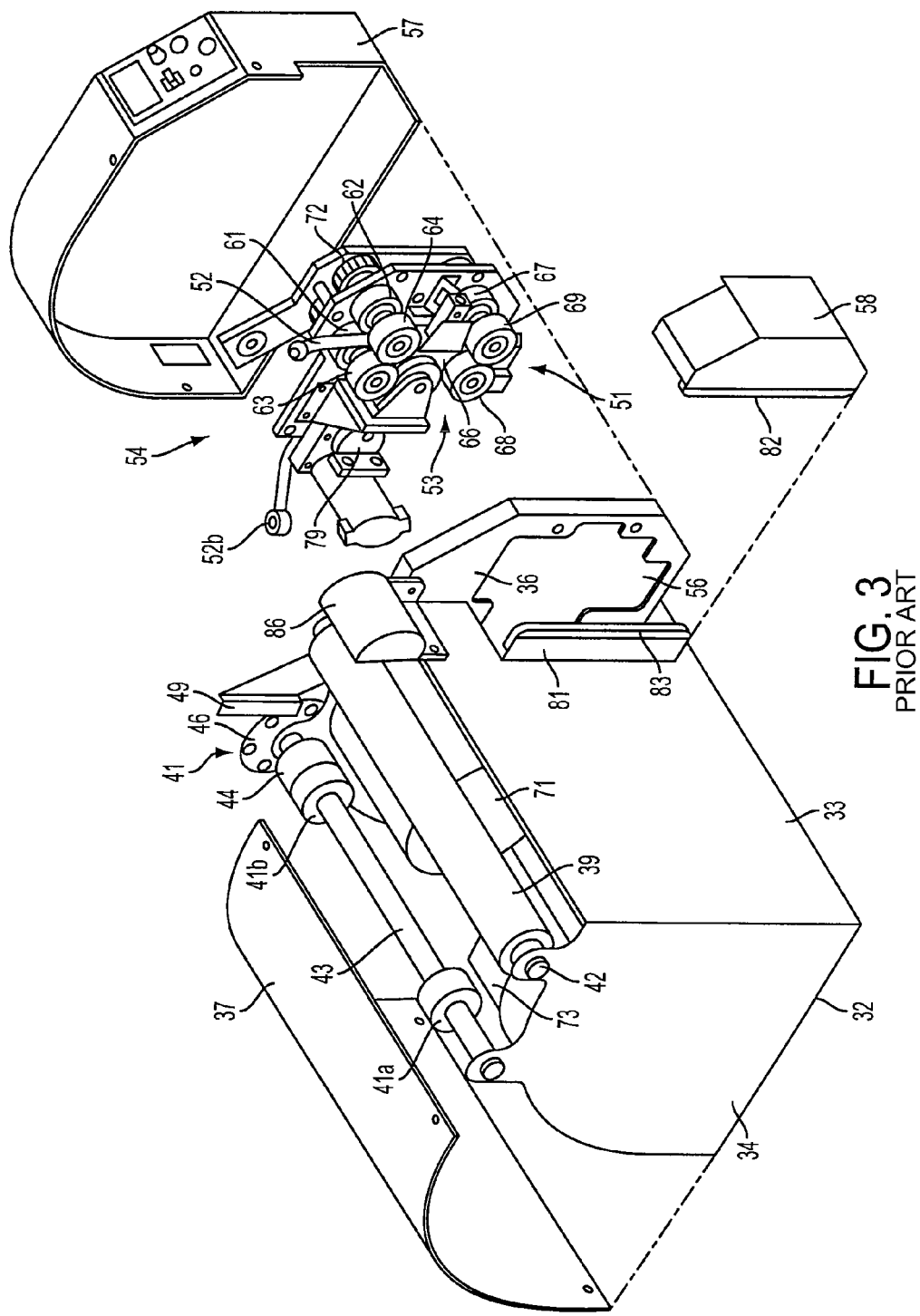
FIG. 3 is an exploded perspective view of the apparatus shown in FIG. 2.

A drive mechanism 51, an elongate member 52 and a sealing assembly 53 may be combined into a single modular unit 54 which may be located toward the front of the machine. As shown in FIG. 3, the modular unit 54 can be removably mounted on the outer side of end wall 36, and projects through an opening 56 in that wall, with an end cover 57 and a front cover 58 enclosing portions of it.

Still referring to FIG. 2, cover 58 may terminate just in front of the path traveled by the film material in passing through the feed rollers and sealing assembly. A flange 81 may extend from the front wall of the cabinet in alignment with the left side of the cover and terminate just to the rear of the film path. The apparatus may also include guide shoes 82, 83 mounted on the confronting edges of the cover and flange to define an access opening 84 for the film material and to help guide the material into the feed rollers. Additionally, a guide 86 may be positioned toward the front of the cabinet above the elongate member and feed rollers to guide the film material toward them.

A control panel 87 may be located in any suitable position such as on an inclined portion of end cover 57 to the right of the drive module. This panel may include various controls such as controls for turning the machine on and off and for controlling various operational functions such as number and firmness of cushions being made. In addition, the control panel 87 may include controls for adjusting various operating parameters in response to data received from the supply of film, as discussed more fully below.

Operation and use of the machine can be described with reference to FIG. 6. The roll of prefabricated film material 28 may be placed on rollers 39, 41, with the longitudinally extending channel side of the roll 19 abutting against stop 49, so that the longitudinally extending channel itself is aligned with nip roller 44 and elongate member 52. While the feed mechanism in FIG. 6 has several advantages such as ease of use, is also possible to utilize another suitable feed mechanism including a cantilevered feed roll mechanism, for example.

Figure 6:
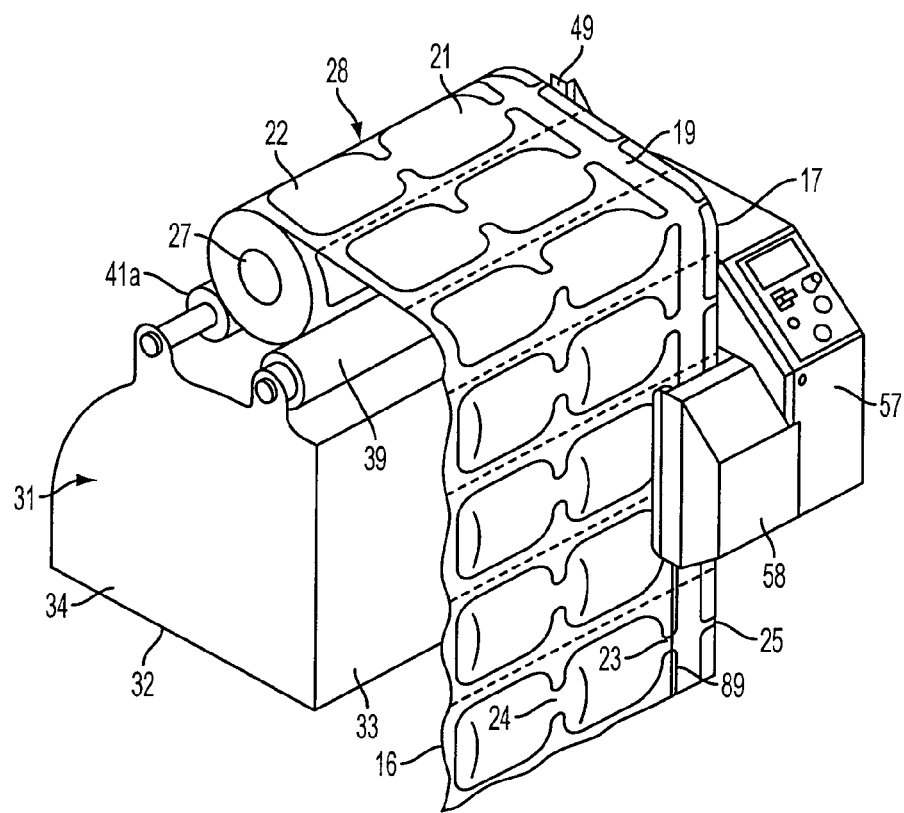
FIG. 6 is an operational view of the apparatus of FIG. 2 transforming a prefabricated film material into air-filled packing cushions.

Still referring to FIG. 6, the free end of the film material may be pulled down over guide 86 (shown in FIG. 3) and onto a guide such as the elongate member. Although the guide may be variously configured, in some embodiments the guide is an elongated member which extends into the longitudinally extending channel 19. Once over the guide, it may be desirable for an operator to continue to pull down on the material until it engages the upstream feed rollers and is thereafter fed by the rollers. The guide or elongate member performs the function of guiding and keeping the film material properly aligned with the rollers.

As the film material travels past the guide such as the elongate member, air or another suitable gas may be injected into the film using any suitable mechanism either incorporated into the guide or separate from the guide. Where a gas is injected by the guide, it may be injected using a nozzle in the guide. Where air is injected from a location or nozzle disposed external to the guide, it may be preferable to position the source of the air injection port near the feed path of the film. In either case, in the exemplary film discussed above, a gas may be injected through openings such as openings 23, 24 and into chambers such as the exemplary chambers 21, 22 discussed above. The gas may be confined the portion of the film between the air injection apparatus and where it is pinched off by roller 39 and/or roller 41b. Depending upon the diameter of the roll, the film material may be withdrawn from the roll at about 90 to 180 degree angle from the point where the longitudinally extending channel is pinched closed by the roller.

The guide may be variously configured. In one exemplary embodiment shown in FIG. 2, the guide includes an enlarged bulb 52a at the upper end of an elongate member. The bulb 52a may be configured to facilitate movement of the film material over the end portion of the elongate member and to prevent air from escaping back along the elongate member from the longitudinally extending channel. A fitting 52b may be provided at the other end of the elongate member for connection to an air pump.

Figure 4:
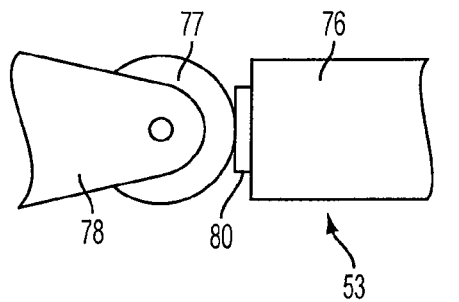
FIG. 4 is a fragmentary side elevation view of the sealing unit in the apparatus shown in FIG. 3.

With reference to FIGS. 3, 4, and 6, following inflation, the film material may be configured to travel through sealing assembly 53 where roller 77 presses the material into contact with heating element 76. The layers of film material (e.g., two) may be fused together along a relatively narrow seal line 89 which may be configured to extend longitudinally along the film material and across inlet openings 23 to seal the chambers.

The apparatus may be configured to utilize a slitting mechanism such as a knife to slit the film. For example, a slit may be formed in the channel of the film. For example, the slitting mechanism may be configured to slit the film after the guide has been in contact with the film. The slitting mechanism may be positioned either before or after the air inlet. In one exemplary embodiment where the slitting mechanism is positioned after the point in the apparatus where the cushion is inflated and sealed, the film material travels past the knife which slits open the edge of the material next to the longitudinally extending channel so the elongate member can exit from the channel. Other embodiments may slit the film before inflation. Still further embodiments may slit the film at the same time as inflation.

In embodiments where the feed rollers and the elongate member engage only one edge portion of the film material, the machine can process materials of any desired width to make cushions having any desired number of chambers, including cushions having a single chamber that extends the full width of the material.

The drive mechanism shown in FIG. 3 may include various guide rollers such as upstream rollers 61-64 and downstream rollers 66-69. Where included, these rollers engage the edge portion of the film material and feed it through the machine. The upstream and downstream rollers may be arranged in dual sets for engaging the film material on opposite sides of the longitudinally extending channel. In these embodiments, upstream rollers 61, 62 and downstream rollers 66, 67 engage the film material between the longitudinally extending channel and the edge of the material, whereas upstream rollers 63, 64 and downstream rollers 68, 69 engage it between the channel and the chambers. The feed rollers may be driven by any suitable mechanism such as motor 71 which may be mounted inside the cabinet. The motor may include one or more drive gears, pulleys, or other suitable mechanisms on the motor shaft which may be coupled to driving gears 72, pulleys, or other suitable mechanisms affixed to the shafts on which the rollers are mounted. In one embodiment, the gearing may be such that the output rollers rotate slightly faster than the input rollers (e.g., an 8:7 ratio) in order to tension the film material and maintain better control of it as it passes through the sealing assembly.

Elongate member 52 may be positioned between the inner and outer feed rollers and may extend in an upward direction. Optionally, it may curve inwardly as shown in FIGS. 2 and 3, for insertion into the longitudinally extending channel of the film material. Air or another suitable gas may be supplied to the air injector, typically at a pressure on the order of 0.5 to 10 psig by pump such as air pump 73. The pump may also be mounted inside the cabinet. If desired, a regulator (not shown) can be connected between the pump and the air injector to allow users to adjust the air pressure and, hence, the degree of firmness to which the cushions are inflated.

Figure 5:
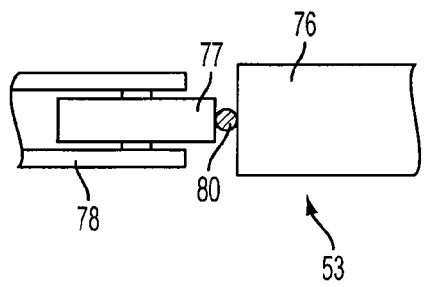
FIG. 5 is a fragmentary cross-sectional view of the sealing unit of FIG. 4.

In the device illustrated in FIGS. 3-5, the sealing assembly 53 may be positioned between the upstream and downstream rollers. The sealing assembly may include one or more heating elements 76 and one or more backing elements which press the film material against the heating element. The backing element may be variously configured to include rollers, belts, or other suitable surfaces. The heating element may be mounted in a stationary position, and the roller may be mounted on a carriage 78. In this embodiment, the roller is pressed against the heating element by a cam 79 when the machine is operating, and withdrawn from the heating element when the machine is idle. This withdraw of the heating element from the backing element while not in operation prevents the heating element from burning the plastic and overheating the backing element.

The heating element may be variously configured to include a rod, a roller, a block, a raised ridge, or other suitable surface. In one exemplary embodiment, the heating element includes a stainless steel rod 80 of relatively small (about ⅛ inch) diameter. The rod may be variously configured, but preferably is configured to extend vertically (or parallel to the direction of film travel) and perpendicular to the axis of the backing roller 77.

The heating element can have a curved surface and the backing element be constructed from a resilient material. When the heating element and the curved surface are urged together, the heating element slightly depresses the resilient surface of the backing element.

The resilient backing element (whether a wheel or another suitable configuration) can be constructed by applying a resilient material on the surface of a metal such as a drum, plate, wheel, box, surface, or other element. A wide variety of resilient materials can be used, such as natural rubber or a synthetic rubber such as silicone rubber. Preferably, the resilient material should be selected such that the film material does not unduly stick to the backing roller during inflation and sealing. Additionally, the resilient material should be selected such that it does not degrade under heat. Preferred resilient materials have a Shore A hardness of from about 20 to about 95 durometer, more preferably from about 45 to about 75, and even more preferably from about 50 to about 70. For example, a silicone rubber of 60 durometer can be used. The resilient material can be applied, for example, by vulcanizing a ¼ inch layer of rubber onto an aluminum or steel backing element. Alternatively, the layer can be prefabricated as band and stretched over a backing element. The roller has the advantage of peeling away from the film and heating element after the sealing operation.

The thickness of the resilient layer generally ranges from a minimum amount sufficient to provide enough deflection to enhance the sealing area as previously described, to a maximum amount above which the roller or backing element can exhibit undesirable deformation during rotation. Most often, the thickness of the resilient layer ranges from about ⅛ to about ¼ inch.

Figure 8:
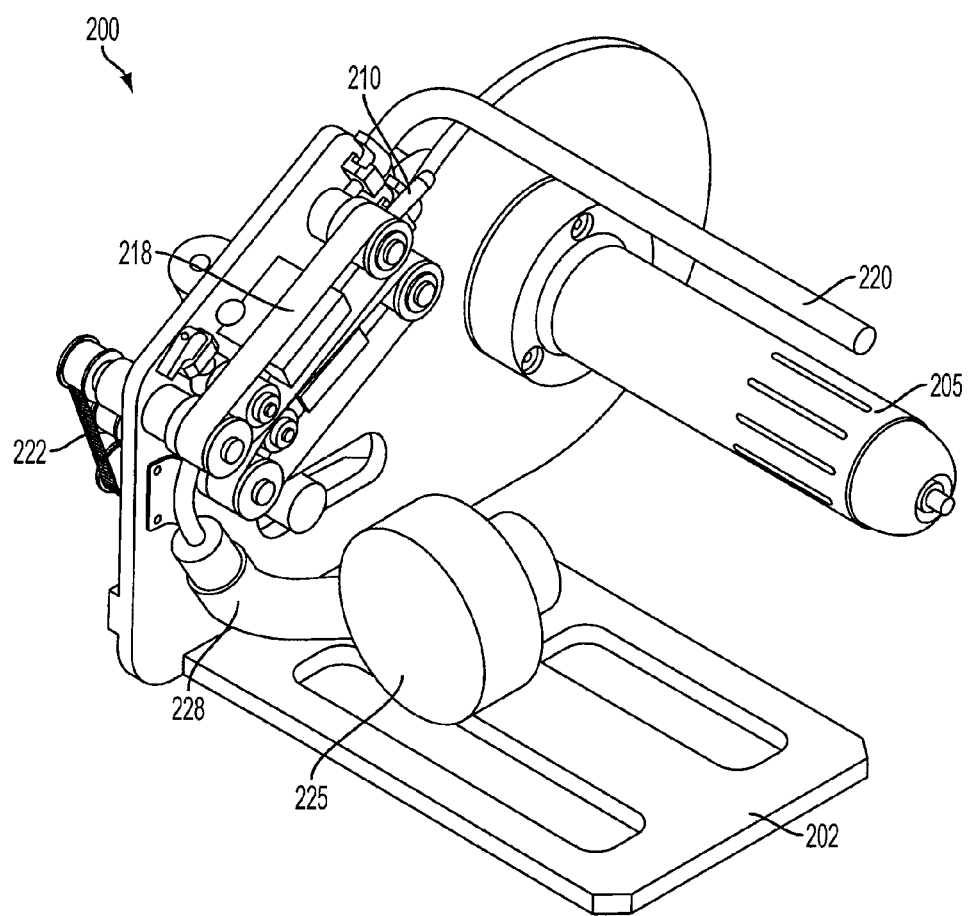
FIG. 8 is a front perspective view of an apparatus for inflating and sealing air filled packing cushions in accordance with another embodiment of the invention.
Figure 9:
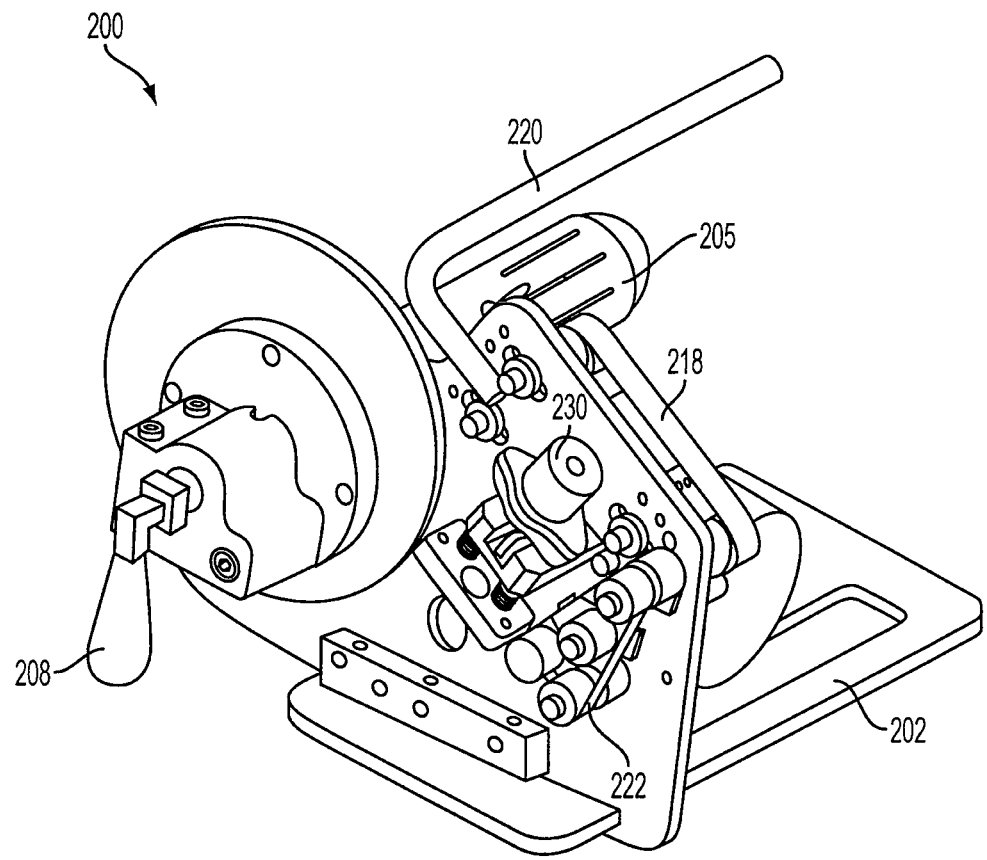
FIG. 9 is a rear perspective view of the apparatus shown in FIG. 8.
Figure 10:
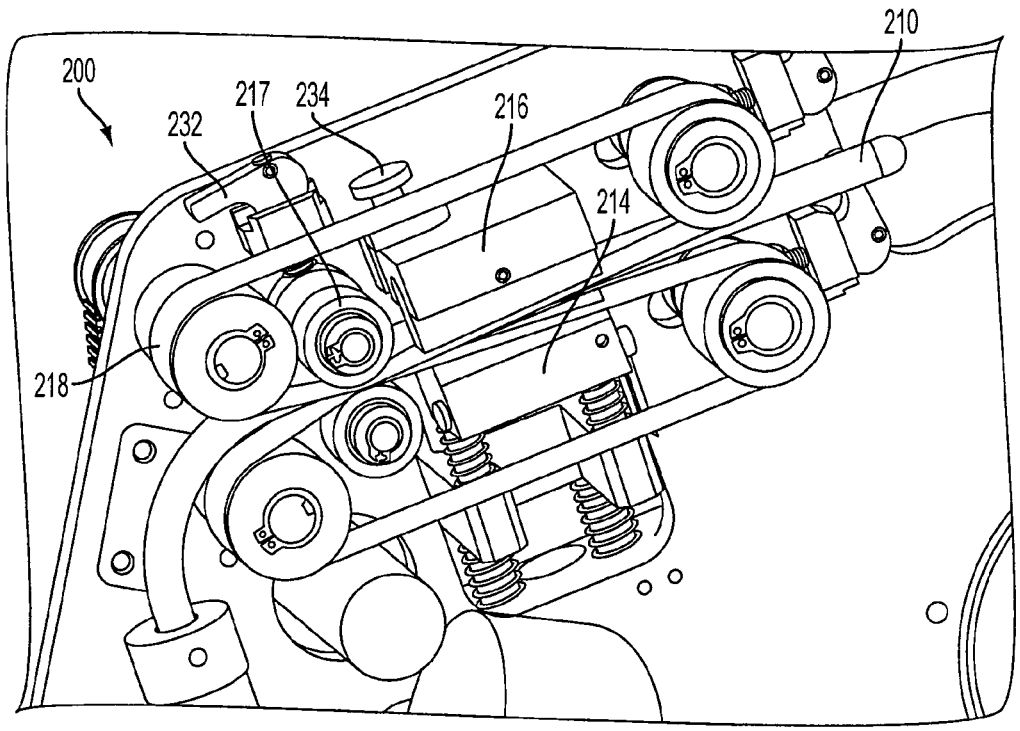
FIG. 10 is an exploded view of the sealing mechanism of the apparatus shown in FIG. 8.

FIGS. 8-10 illustrate another example of an apparatus 200 for inflating and sealing packing cushions. The apparatus 200 is relatively compact and is adapted to be conveniently placed on a table top or other surface, such as a custom stand (not illustrated). The apparatus 200 can be constructed of a lightweight material such as a durable plastic or light metal. With reference to FIGS. 8 and 9, the apparatus 200 includes a frame having a base 202 and a vertical wall supporting a mandrel 205, a film guide 220, a sealing mechanism having a belt drive 218 having opposed belts, and an adjustable speed blower 225 for supplying air to an air injector 210 via an air supply tube 228. The belt drive 218 is driven by a motor-driven belt 222 positioned on the opposite side of the vertical wall. The film guide 220 establishes a constant film path to the sealing/inflation area, so that the angle the film enters the sealing/inflation area does not change as the supply of film on the roll diminishes when the film is unwound.

With reference to FIG. 9, the mandrel 205 can be equipped with a clamping mechanism for securing a roll of film. The clamping mechanism includes a handle 208 that is movable between a disengaged position (e.g., where the longitudinal axis of the handle 208 is generally parallel to the axis of the mandrel 205) to an engaged position in which the axis of the handle is generally perpendicular to the axis of the mandrel 205, as shown in FIG. 9. Moving the handle 208 into the engaged position causes relatively small tabs located inside the mandrel 208 to move outwardly in the radial direction. The tabs can project, for example, through slots located along the circumference of the mandrel 205, as illustrated in FIGS. 8 and 9. The tabs press into the core of the film roll to securely hold the film roll on the mandrel 205.

FIG. 10 is an exploded view of the inflation/sealing area of the apparatus 200. The film is pulled over an elongate guide 210 so that the guide 210 is inserted into a channel located along the longitudinal edge of the film. In this embodiment, the guide 210 also functions as an air injector by discharging air (or other inflation gas) through one or more openings located at or near the distal end of the guide 210. A knife blade is located along the guide 210 for slitting the film to permit continued movement of the film past the sealing area. The inflated cushions are heat-sealed as the film passes between a heated seal bar 214 and a backing surface 216. The seal bar 214 is heated by a cylindrical cartridge heater, which is constructed from hard anodized aluminum. The heater has a thermocouple controller for maintaining a desired sealing temperature. The backing surface 216 typically is not heated and can be constructed from silicone rubber or other suitable resilient material as previously described.

A pair of nip rolls 217 may be provided to press the film together after the longitudinal seal is formed. The nip rolls 217 help cool the film in the area of the longitudinal seal and help avoid delamination of the seal as the film continues to be fed through the apparatus 200. The nip rolls 217 may be cooled if desired, although it is generally not necessary to cool the nip rolls 217.

The apparatus 200 can be of modular construction to simplify maintenance. For example, quick disconnect levers 232 can be provided to enable easy access to the inflation/sealing assembly shown in FIG. 10 and/or other components of the apparatus. The quick disconnect levers 232 can be released, for example, to allow the belts 218 to be replaced. A thumb screw 234 holds the knife blade in place on the guide 210, and can be loosened to permit maintenance or replacement of the knife blade.

A linear stepper actuator 230 (illustrated in FIG. 9) is provided for adjusting the position of the seal bar 214 (see FIG. 10). The position of the seal bar 214 can be adjusted for increasing or decreasing the pressure between the seal bar 214 and the backing surface 216. Alternatively, sealing pressure can be adjusted by compressing springs or by compressing a spring-like rubber material. For example, the actuator stroke can be adjusted to compress springs more or less to create more or less seal force, respectively. Sealing pressure can be adjusted, for example, to accommodate films of different thickness. The stepper actuator 230 also can be used for moving the seal bar 214 away from the backing surface 216 when operation of the machine is stopped, e.g., for moving the seal bar 214 between engaged and disengaged positions. As an alternative to a linear actuator, sealing pressure can be made adjustable by providing a thumb screw or the like for adjusting the position of the sealing element and/or backing surface and without requiring significant disassembly of the machine or replacement of parts.

Figure 11:
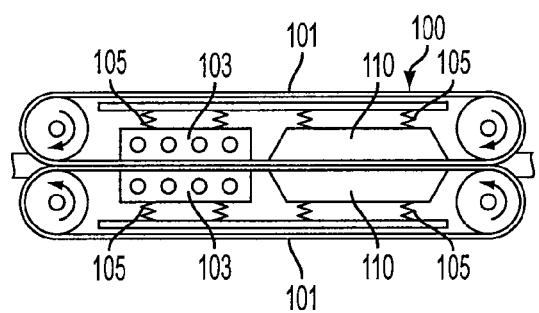
FIG. 11 is a schematic illustration of a sealing mechanism having opposed heated bars in accordance with an alternative aspect of the invention.

FIG. 11 illustrates an alternative example of a sealing mechanism, in particular a belt sealer 100 having opposed traveling belts 101 which carry the film past heater block(s) 110 located on one side of the film or both sides of the film (as shown). One or both of the belts 101 can be constructed from a resilient material, or alternatively can have a resilient material overlying a non-resilient material, such as steel. Springs 105 may be provided for urging the heater blocks 110 (and optional cooling blocks 103) toward the belts 101. Alternatively, a backing wheel, belt, or plate which is resilient (or has a resilient surface) may be used in combination with various types of heating elements, such as a heating bar having conductive wire(s) as shown in U.S. Pat. No. 6,669,150. Other non-limiting examples of sealing mechanisms for air-filled cushions, which can be modified to include resilient backing surfaces, include those shown in U.S. Pat. No. 3,868,285 to Troy and U.S. Pat. No. 4,169,002 to Larson.

Figure 16:
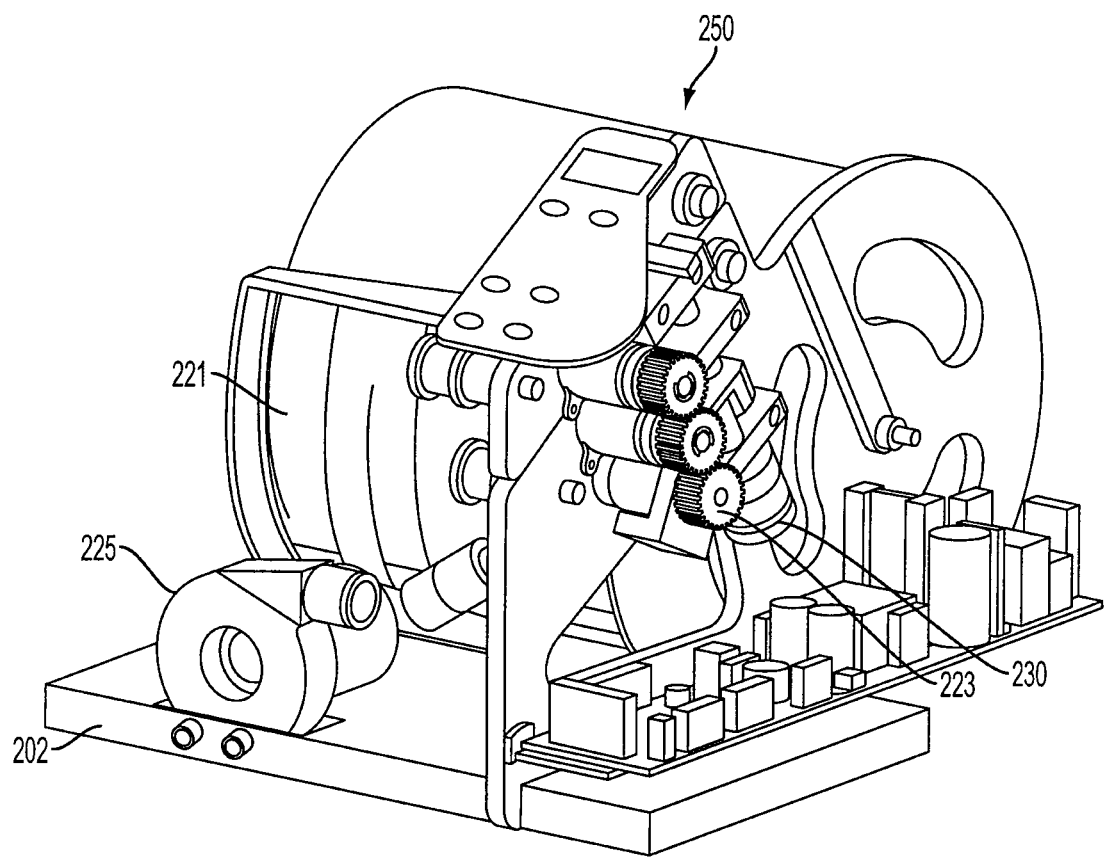
FIG. 16 is a perspective view of an apparatus for inflating and sealing air-filled packing cushions in accordance with a preferred embodiment of the invention.
Figure 17:
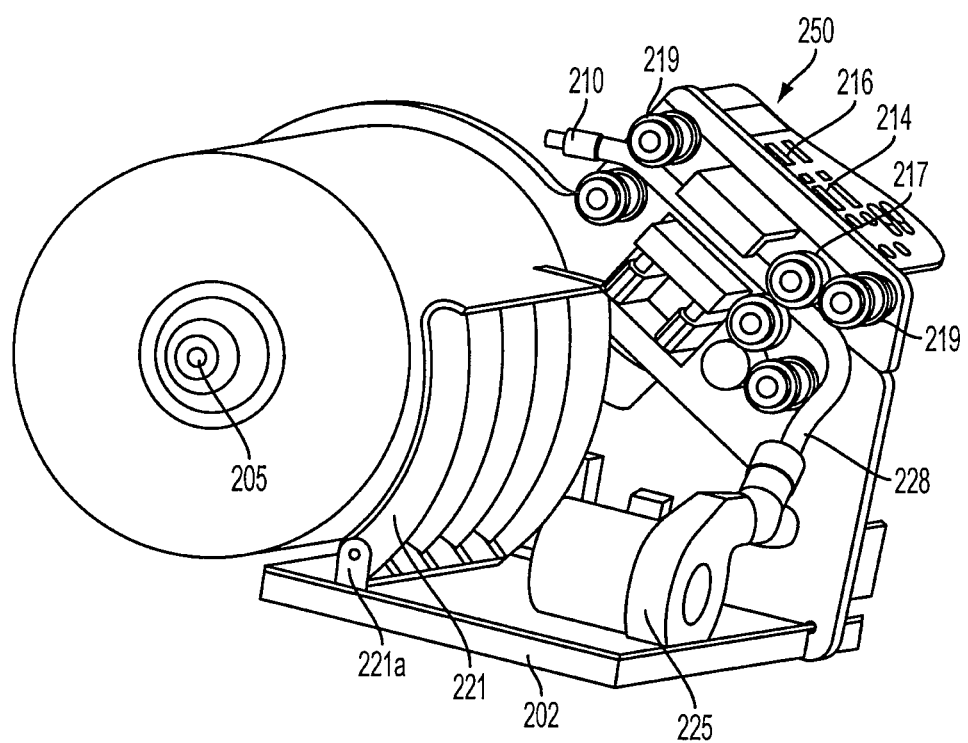
FIG. 17 is a side perspective view of the apparatus of FIG. 16.
Figure 17A:
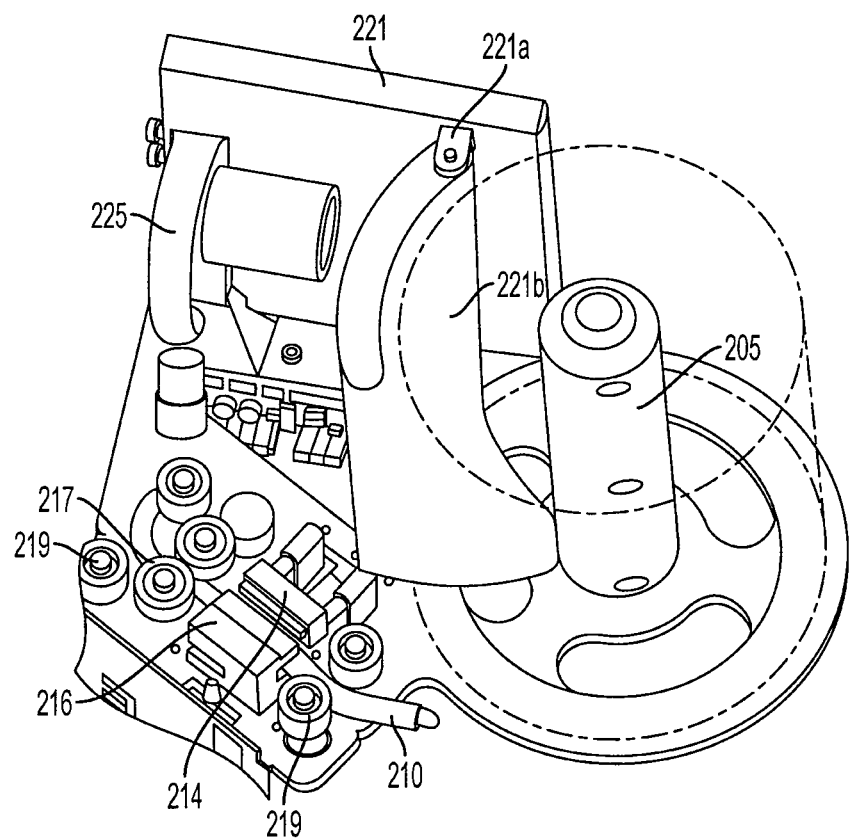
FIG. 17a shows an alternative view of the film guide member of the apparatus of FIG. 16.
Figure 18:
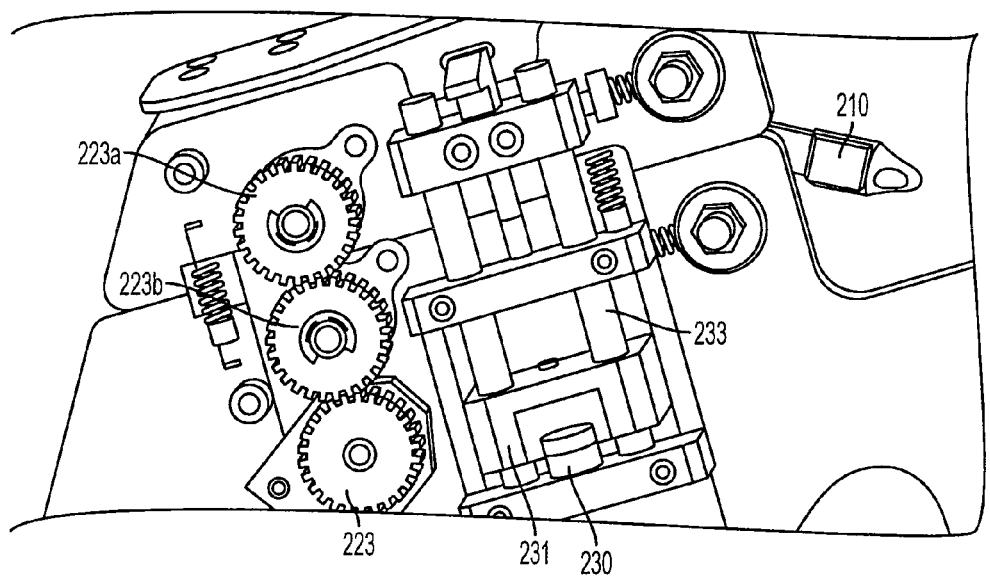
FIG. 18 is an exploded view of the film drive mechanism in the apparatus of FIG. 16.

FIGS. 16-18 illustrate an alternative embodiment of an inflation and sealing apparatus. Components of like reference numbers correspond to those described above in connection with the embodiment of FIGS. 8-10. A control panel 250 can include buttons for operating the machine and any user-inputted information and a display for operating conditions, error messages, and the like. With reference to FIGS. 16 and 17, the apparatus includes a film guide mechanism 221 which is spring-biased toward the roll of film. The guide mechanism 221 pivots on an axis 221a that is generally parallel to the axis of the mandrel 205. The guide mechanism 221 may have a curved surface 221b, as illustrated in FIG. 17a. The surface 221b can be shaped so that the distance between the guide mechanism 221 and the mandrel 205 is the greatest at the distal end of the mandrel and the shortest at the other end of the mandrel, e.g., adjacent the side wall. The shaped surface 221b helps to enable an operator to slide a roll of film onto the mandrel 205 without needing to retract the guide mechanism by hand. As a film roll is slid onto the mandrel 205, the roll contacts the curved surface 221b, which pushes the guide mechanism 221 away from the mandrel 205. With the film roll in place, the guide mechanism 221 is biased against the roll and provides some resistance to rotation, e.g., sufficient to prevent the film roll from continuing to unwind after operation of the film drive discontinues.

In the embodiment shown in FIGS. 16-18, nip rolls 217 are mechanically driven while the drive belts (not illustrated) are positioned around upper and lower sets of idle rollers 219. With reference to FIGS. 16 and 18, a drive motor rotates a primary drive 223, which engages and rotates drive wheels 223a and 223b that share a common axle with the upper and lower nip rolls 217, respectively. The drive motor can be a fixed speed motor or, optionally, a variable speed motor. In the case of a variable speed motor, the speed of operation can be adjusted by an operator entering information on a keypad, or can be communicated from an RFID tag or the like on the film supply.

FIG. 18 illustrate details of a mechanism for adjusting sealing pressure. A linear stepper actuator 230 can be used for adjusting the position of the seal bar 214. The actuator 230 can displace a positioning member 231 along a pair of shafts 233. The heat seal bar 214 is attached to the positioning member 231 and thus its relative position can be adjusted by the positioning member 231.

An air cushion inflation and sealing device, such as one having any of the aforementioned configurations, can be equipped with a control system for obtaining information from the film or film supply in accordance with one aspect of the invention. The information can be contained on the film itself or on structure associated with a film supply, for example on a core on which a roll of film is wound. The information obtained from the film or film supply can be used to set one or more operating parameters for operation of the apparatus, such as seal temperature, seal pressure, air-fill levels, and operational timing delays in the drive components. These and other operating parameters may be affected by the thickness and composition of the film, the size and configuration of the inflatable chambers, and/or other properties of the film. The controller can be retrofitted to an existing device or incorporated into a new device.

Figure 12:
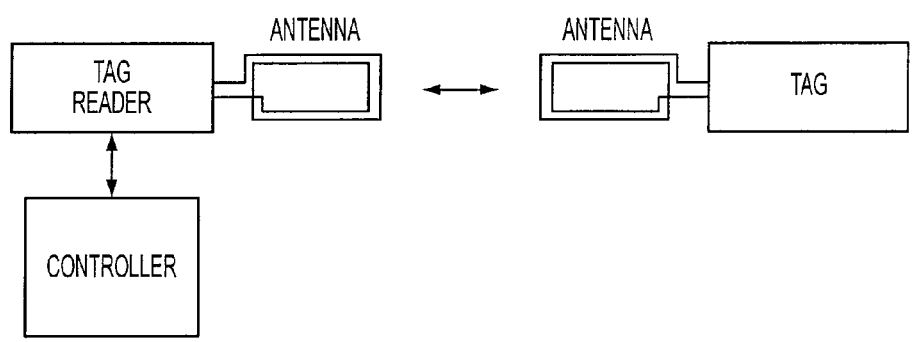
FIG. 12 is a block diagram of an RFID transmitter and reader that can be used for film recognition in accordance with one embodiment of the present invention.
Figure 19:
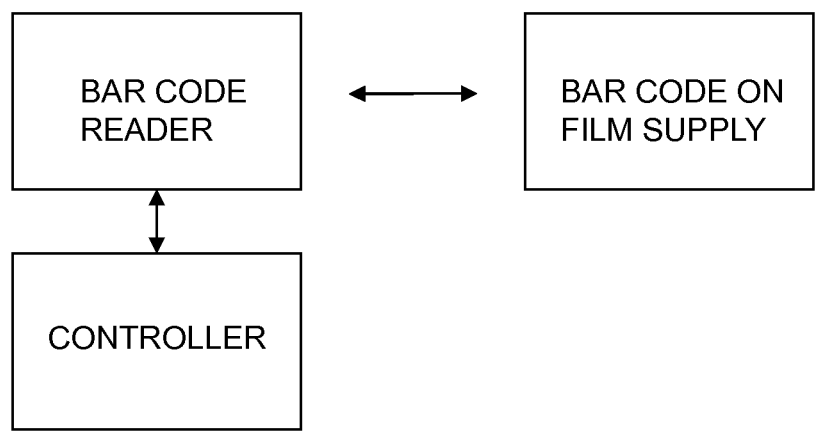
FIG. 19 is a block diagram of a bar code reader/bar code combination that can be used for film recognition in accordance with another embodiment of the invention.

With reference to FIG. 12, the controller can utilize radio frequency identification (RFID) technology, including a RF transmitter (or "tag") associated with the film or film supply and a RF receiver (or "tag reader") in communication with the controller. The tag and tag reader can each have an antenna, as shown schematically in FIG. 12, to transmit and receive RF signals. Each roll of film can be provided with a single tag, for example. Alternatively, tags can be placed at a plurality of locations along a supply of film, e.g., at periodic intervals. For films that are wound on a supply roll, the tag can be affixed, for example, to the core on which the film is wound. The tag reader can be affixed to the apparatus in proximity to where the film is placed, for example within the interior of the mandrel 205 illustrated in FIGS. 8-9. FIG. 19 schematically shows an alternative embodiment wherein the controller communicates with a bar code reader to obtain information from a bar code present on the film supply.

During use, the controller can be configured to send an excitation signal to the tag located on the film or film supply. The tag then transmits information back to the controller for setting the operation parameters. The controller can be configured to be capable of reading information from the tag and, if necessary, writing information to the tag as well.

One key advantage of the controller is the ability to set operation parameters appropriate for the film automatically with no or minimal operator input. This potentially can reduce the likelihood of improper settings resulting from human error. Optionally, the controller can be configured to disable operation of the apparatus in the event a roll of film not containing an RF tag is positioned on the apparatus. This aspect can be used, for example, to prevent use of incompatible or unauthorized films in the apparatus.

As indicated above, the controller optionally can be configured to write data back to the tag. For example, the amount of material consumed on a roll of film can be determined and then written to the tag. The tag initially may contain information relating to the total length of film present on a fresh roll of film. As the roll of film is processed, the controller can periodically write back to the tag the amount of film processed until all of the film is processed. This feature can be used to prevent a user from removing a tag from an expired film supply and affixing the tag to a new supply of material that may be incompatible or unauthorized for use with the apparatus.

The following is an example of use and operation the RFID controller. A label containing an embedded RF tag insert can be adhered to the inner diameter of a paper roll core of a plastic film roll at the leading edge of the core. A tag reader can be installed inside the mandrel at the edge corresponding to the location of the RF tag. When the tag gets to within a predetermined distance, such as 1.5", of the tag reader, the controller sends an excitation signal to the tag. The excitation signal in turn causes the tag to send data to the controller.

If no signal is acquired from the tag, the controller can be adapted to operate the machine at factory defined default settings, and the maximum range of user-adjustable operational parameters can be made available. Alternatively, if no signal is acquired, the controller can be configured to prevent operation of the machine and/or display an appropriate error message.

If a signal is acquired from the tag on the film supply, the controller can be configured to display a message that the film information has been accepted and any necessary adjustments are being made.

It may be desirable to prevent machine operation when a tag is not detected, or when a tag is detected but the tag contains information indicative of an exhausted film supply. This latter event could occur when a tag is removed from an expired film supply and applied to a fresh supply of film, or when new film is wound onto the core of an expired film supply. Because the tag contains information associated with processing film material of particular characteristics, it is desirable to avoid reuse of the tag with different film materials, which generally require different processing conditions. In the absence of these controls, there is a substantial likelihood that machine operation may take place under inappropriate conditions, which may lead to such problems as charring, burning, or melting of the film, inadequate seal strength, and/or improper inflation levels. This could be lead to consumer dissatisfaction with machine performance and could be burdensome on machine suppliers, who may need to respond to otherwise avoidable service calls.

The use of machine-readable technology with air cushion machines as described herein is intended to replace, at least in large part, the need for significant operator training, instruction manuals, and user input. These objectives are best met when a film supply contains a data source with instructions for appropriate machine operation for that particular film material. On the other hand, these objectives would be frustrated if operation of the machine were permitted without such information or with information not appropriate for the particular film material processed.

In some cases, users may want to have the capability of fine-tuning certain operating parameters to meet user preferences. The controller can be configured to permit users to adjust some or all of the parameters within preset limits. For example, the user may be permitted to adjust a value within ±10% of a programmed value. Normally a midrange setting is selected for this programmed value to allow for slight user adjustments while preventing gross over-adjustments. Non-limiting examples of user-adjustable parameters include seal temperature and air fill level.

The tag reader can be configured to continually scan (e.g., once per second) for information while the machine is running. The tag-reader initially attempts to communicate with the tag on the film roll when the machine is powered up. The controller can be adapted to discontinue operation of the machine if tag information is not received within a specified time period. Alternatively, the controller can be configured to continue operation of the machine at the existing parameters or at default parameters in the event that tag information is not received.

When a tag is sensed, the controller can be configured to read and write blocks of information from and to the tag, respectively. If desired, each block of information can be locked to prevent used blocks from being reprogrammed. The controller also may store information on operating of the machine, for example the amount of time the machine is operated, the amount of film processed, error messages occurring during operation, and so on. This information may be useful when servicing the machine.

The tag-reader may contain two communication protocols. For example, communications between the controller and the tag-reader may employ a SPI (Serial Peripheral Interface) protocol. Communications between the tag-reader and the tag may use commands from the ISO 15693 protocol. After the controller initiates communication with the tag, the controller sends a command to the tag-reader. The tag-reader translates the command to an ISO 15693 command and sends it to the tag. The response of the tag is then stored in the tag-reader until the controller retrieves it.

As an alternative to RFID tags, the apparatus may utilize any number of other techniques for transmitting data from a film or film supply to the controller. For example, the film or film supply can be printed with a bar code or registration marks, or a label containing a bar code or registration marks, or the like can be adhered to the film or film supply. The controller can retrieve the information from the film or film supply using a bar code reader or other appropriate reader.

With reference to the device shown in FIGS. 8-10, the controller can be adapted to control operation of one or more of the stepper actuator 230, the seal bar 214, the blower 225, and the various drive belts 218, 222. In one embodiment, the controller is capable of adjusting each of sealing pressure, sealing temperature, air-fill level, and operational timing delays in the drive components. Sealing pressure can be controlled by controlling operation the stepper actuator 230. Sealing temperature can be controlled by controlling the amount of heat applied to the seal bar 214. Air-fill level can be controlled by controlling operation of the blower 225. Operational timing delays can be controlled by controlling operation of the various drive components 218, 222, etc. Each of these parameters can be controlled according to a predetermined schedule that is appropriate for the particular film configuration used.

According to another aspect of the invention, a source of preconfigured film material having inflatable chambers is provided with a data source containing information relating to one or more properties of the film and/or conditions appropriate for its inflation and sealing. The data source may be a RFID tag, a bar code, registration marks, or any other type of machine readable source of information. The data source may be applied directly to the film, e.g., by printing, or may be applied indirectly to the film, e.g., by an adhesive label. Instead of being applied to the film itself, the data source may be applied to structure associated with the supply of film, e.g., the core on which the film is wound or a box or other container of folded film.

The preconfigured film may have any of the above-described configurations, e.g., the film may be closed along both longitudinal edges or may be open along one longitudinal edge. The film may contain a longitudinal channel for receiving a guide and/or inflation member. Alternatively, the film may have an open edge through which air or other gas is injected to inflate the preconfigured chambers. The chambers may be generally rectangular, circular, or other desired shape.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. An apparatus for inflating and sealing packing cushions from prefabricated film material having a plurality of chambers, the apparatus comprising a feed mechanism for feeding the film material along a path, an inflation mechanism for injecting inflation gas into the chambers, a sealing mechanism for sealing the chambers, wherein the sealing mechanism comprises a sealing element and a backing surface; wherein the apparatus further comprises:
   a controller in communication with a reader for determining at least one property of the film material from a data source associated with the film material when the film material is positioned in proximity to the apparatus; and
   a linear actuator in communication with the controller for controlling sealing pressure by adjusting the force between the sealing element and the backing surface based on the film property data received from the controller.

2. The apparatus of claim 1, wherein the backing surface is constructed from a resilient material.

3. The apparatus of claim 1, wherein the controller obtains information from the film material when the film material is placed in an operating position.

4. The apparatus of claim 1, wherein the controller obtains information from the film material when the film material is positioned within a predetermined distance from the apparatus.

5. The apparatus of claim 1, wherein the reader is a bar code reader for obtaining information from a bar code present on the film material.

6. The apparatus of claim 1, wherein the reader is a radio frequency identification (RFID) tag reader for obtaining information from an RFID tag present on the film material.

7. The apparatus of claim 1 wherein the sealing element comprises a heated rod.

8. The apparatus of claim 1 wherein the sealing element comprises a heated roller.

9. The apparatus of claim 1 wherein the backing surface comprises a wheel.

10. The apparatus of claim 1 wherein the sealing mechanism comprises a pair of opposed belts for carrying the film past at least one heated block.

11. The apparatus of claim 1 wherein the prefabricated film material has a longitudinally extending channel, the apparatus further comprising an elongate member adapted for insertion into the longitudinally extending channel.

12. The apparatus of claim 11, wherein the elongate member has at least one opening for injecting inflation gas into the longitudinally extending channel.

\* \* \* \* \*